United States Patent [19]

Wennberg

[11] 4,152,256

[45] May 1, 1979

[54] SPRING RETAINING CLIP FOR VIBRATING SCREEN DECK

[75] Inventor: Donald W. Wennberg, Chisago City, Minn.

[73] Assignee: UOP Inc., Des Plaines, Ill.

[21] Appl. No.: 624,512

[22] Filed: Oct. 21, 1975

Related U.S. Application Data

[63] Continuation of Ser. No. 512,378, Oct. 7, 1974, abandoned.

[51] Int. Cl.$^2$ .............................................. B07B 1/46
[52] U.S. Cl. ................................. 209/395; 24/261 R; 24/81 CC; 24/73 C
[58] Field of Search ................ 209/392–396, 209/313, 404; 24/73 C, 137 A, 261 R–261 G, 81 CC; 29/172; 215/101; 140/82

[56] References Cited

U.S. PATENT DOCUMENTS

| | | | |
|---|---|---|---|
| 402,961 | 5/1889 | Moody | 24/261 FC |
| 793,625 | 6/1905 | Corneil | 24/261 C X |
| 2,234,368 | 3/1941 | Cooley | 24/261 C X |
| 3,305,090 | 2/1967 | Morawski et al. | 209/288 |

FOREIGN PATENT DOCUMENTS 1346211  2/1974  United Kingdom ................ 24/261 PT

*Primary Examiner*—Ralph J. Hill
*Attorney, Agent, or Firm*—James R. Hoatson, Jr.; Barry L. Clark; William H. Page, II

[57] ABSTRACT

Spring retaining clips formed of spring wire firmly hold a screen deck to a plurality of mounting bars on a vibrator. The clips each have facing, semi-circular upper and lower end portions connected on one side to slightly angled connecting portions which are joined by a central loop portion. As a clip is mounted over a support rod on the bottom of a screen deck and under a mounting bar on the vibrator, its ends are forced apart causing the angled connecting portions to become vertical as they move toward contact with a vertical side portion of the mounting bar. Additional separating forces applied between the ends of the clip during vibration of the screen deck after the connecting portions have become vertical are strongly resisted by the ever increasing force exerted by the central loop portion which must assume a smaller diameter as the end portions move apart.

2 Claims, 5 Drawing Figures

SPRING RETAINING CLIP FOR VIBRATING SCREEN DECK

CROSS-REFERENCE TO RELATED APPLICATION

This application is a continuation of Ser. No. 512,378, filed Oct. 7, 1974, and now abandoned.

BACKGROUND OF THE INVENTION

This invention relates to vibrating screen decks used for sizing pellets or other forms of material, and particularly to a replaceable fastener for holding the screen deck in contact with the vibration apparatus.

As the nation's supply of rich iron ore has been depleted it has been necessary to utilize taconite, a flint-like rock having a low iron content. The ore is crushed to a powder and the portions which are extremely rich in iron are magnetically separated from the remainder. The iron rich powder is mixed with small balls of bentonite in a ball mill where it coats the bentonite and forms pellets which form a very satisfactory charge material for steel making furnaces. For best results, the pellets must be of a uniform size. Sizing is accomplished by discharging the pellets from the ball mill to a vibrating screen deck which permits the undersize pellets to fall through while the larger pellets are transported to a second screen which separates pellets of the desired size from the oversized pellets.

The taconite pellets are handled in tremendous volumes. Since they are quite abrasive, it is usually necessary to replace the screen decks every two to four months. Conventionally, the large screen decks, which might have an overall size of about 2.5×6 m, comprise heavy guage stainless steel bars welded to underlying support rods. The deck is normally fastened, in sections of about 0.5 m width, to a series of spaced mounting bars carried by the vibrator apparatus. Typically, fastening has been accomplished by a large number of heavy bolts and nuts which must be assembled and removed by workmen operating in the very dirty and cramped space under the mounting bars. Many times, some of the holes in the new decks do not line up with the corresponding holes in the mounting bars, causing a great deal of difficulty in assembly. Also, the old bolts are usually so rusted and worn that they must be chiseled off.

With downtime for screen replacement currently costing about $600–$800 per hour and with replacement normally taking several hours it will be readily evident that a faster means to attach screen decks would be most desirable. Many screen deck users have attempted to eliminate the undesirable aspects of bolt type fasteners by utilizing C-shaped retaining clips formed of spring wire. These clips can be attached and removed from the top of the deck with relatively little effort. However, the fact that 300–400 clips or more are used on a given screen deck still requires considerable installation time. Unfortunately, it has been found that the C-clips that have been used in many installations have not been satisfactory. The clips are necessarily stretched as they are snapped over the mounting bar during installation, causing them to take a permanent set which considerably reduces their ability to resist the natural tendency of the screen deck to be separated from the mounting bars during the operation of the vibrator. Consequently, some of the C-clips are often stretched sufficiently to fall off the mounting bars shortly after the deck is first placed in operation. This places a greater load on the other clips and soon the screen deck may begin violently pounding against the mounting bars until it is damaged or the apparatus is shut down so that the lost and overly stretched clips can be replaced. When the apparatus must be shut down for clip replacement before the screen deck is worn out, the downtime savings produced by the use of clips rather than bolts and nuts is reduced or eliminated.

Obviously, it would be of tremendous benefit to screen deck users to have a fastening means that provides the long term fastening security of a bolt system and the assembly and disassembly convenience of the standard C-clip retainer.

It is among the objects of the present invention to provide an improved retaining clip which is as simple to install and remove as the conventional C-shaped clip currently being used but which takes a lesser set during assembly while providing greater holding forces as the screen deck tends to move further and further away from the mounting bars during vibration.

SUMMARY

The aforementioned and other objects are achieved by the retaining clip of the present invention which is similar to the prior art C-shaped clip only in that it is made of heavy gauge spring wire such as music wire and includes curved, facing upper and lower portions adapted to partially surround, respectively, a support rod integral with a screen deck and a grooved mounting bar on a vibrator upon which the support rod rests. The improved clip is characterized by a central loop portion positioned intermediate the curved end portions and connected to the end portions by diverging intermediate portions. The distance between the end portions is selected so that when the clip is stretched during assembly to a screen deck and mounting bar, the intermediate portions will tend to become aligned with each other and parallel with the vertical plane of the mounting bar or to touch it. The ends of the intermediate portions which define the ends of the central loop portion are initially drawn sideways toward contact with the vertical mounting bar as the ends of the clip are stretched during assembly. Accordingly, the intermediate portions are not able to move further sideways as the end portions are subjected to further stretching forces during vibration of the screen deck. These additional forces are resisted by a decrease in diameter of the central loop portion caused by the vertical opposed movements of the intermediate portions. By proper selection of wire size and loop diameter it is possible to obtain sufficient holddown force to retain the screen deck during vibration while introducing a minimum of spring set during assembly. This latter feature is most important since the clip is necessarily stretched approximately 9.52 mm during mounting and remains stretched about 6.35 mm after assembly. In a static test of a conventional C-shaped clip and the improved clip where the clips were made of identical wire and stretched 9.52 mm, the conventional clip was found to take a set of about 2.29 mm as compared to a set of only about 1.04 mm for the improved clip. The lesser set taken by the improved clip during assembly results in the clip retaining much greater holding power than the conventional clip. This advantage was evidenced when a screen deck retained by 200 clips made in accordance with the invention was operated for more than three months until it was worn out. An inspection at that time showed all clips to be intact.

DESCRIPTION OF THE PREFERRED EMBODIMENT

Figure 1:
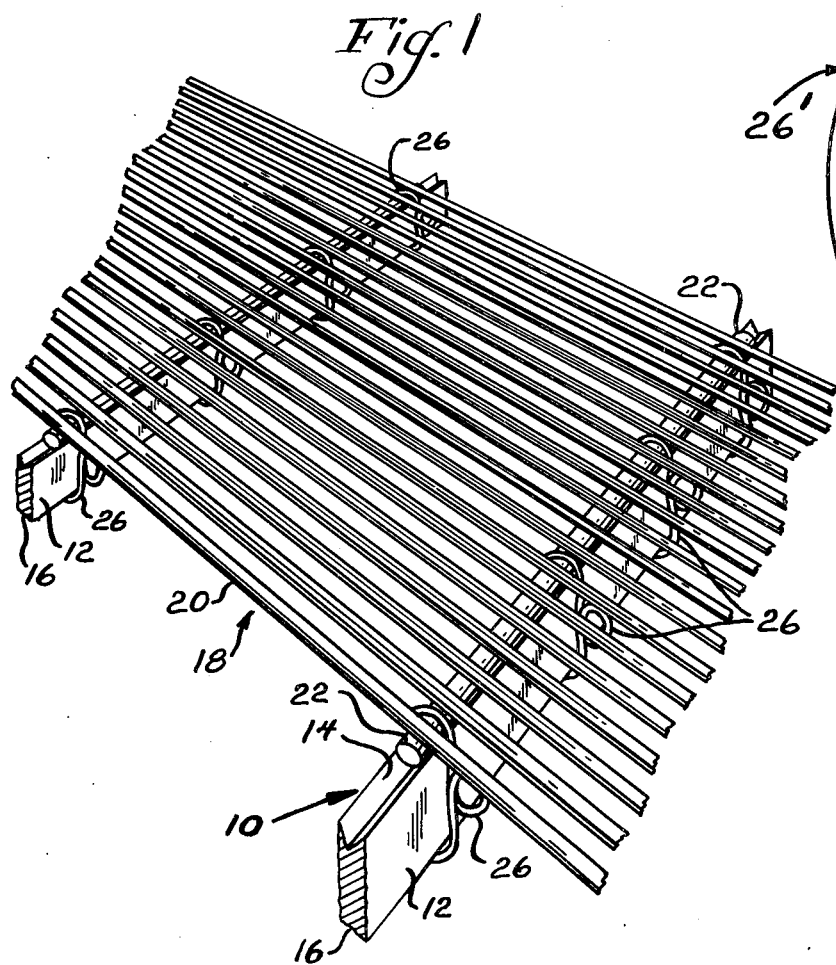
FIG. 1 is a fragmentary perspective view of a screen deck held to the mounting bars of a vibrating device by the spring retaining clips of the invention.

Referring to the drawings, FIG. 1 illustrates the environment in which the invention is used. A vibrating screen deck assembly indicated generally at 10 includes a plurality of spaced mounting bars 12 which are part of a framework (not shown) which is adapted to be vibrated by a vibrating assembly (not shown). The mounting bars 12 have a grooved upper surface 14 and a flat lower surface 16. A plurality of replaceable screen panels indicated generally at 18 are supported by the mounting bars 12. The panels 18 are formed by welding a plurality of spaced rod members 20 to a plurality of support rods 22 positioned normal thereto. The support rods 22 are located so that they will engage the grooves 14 in mounting bars 12. Although the support rods 22 are shown as being round and the mounting bar surfaces 14 are shown as grooved in the drawings, each of these members could take other shapes which would maintain the respective members from sideways separation when forced together in a vertical direction by retaining clips 26.

Figure 2:
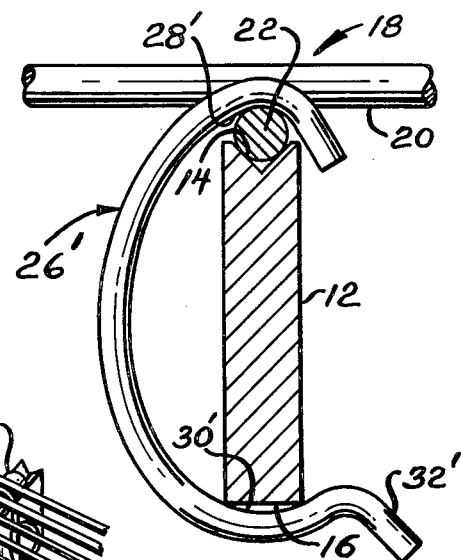
FIG. 2 is a view showing a prior art retaining clip in association with a screen deck and mounting bar.

The retaining clip indicated generally at 26 is an improvement over the prior art retaining clip 26' shown in FIG. 2. The prior art C-shaped clip 26' includes an upper curved portion 28' and a lower curved portion 30' which are respectively adapted to engage and apply pressure to the upper side of support rod 22 on the screen deck and the lower side 16 of the mounting bar 12 on the vibrator assembly. The C-shaped clip 26' is assembled from the top of panel 18 over the support rod 22 and a tool (not shown) is then used to pivot the clip in a counter-clockwise direction so that the ramp surface 32' will ride over the lower surface 16 of the mounting bar 12 into the assembled use position shown. As previously discussed, the stretching of the prior art clip which takes place during assembly introduces a considerable set in the spring wire material of which the clip is made so that even though the clip exerts a restraining force tending to hold the screen panel 18 to the mounting bar 12 the restraining force is often insufficient to prevent the forces developed during vibration of the apparatus from stretching the ends of the spring clip apart sufficiently so that the ramp surface 32' moves to the left of lower surface 16 of the mounting bar.

Figure 3:
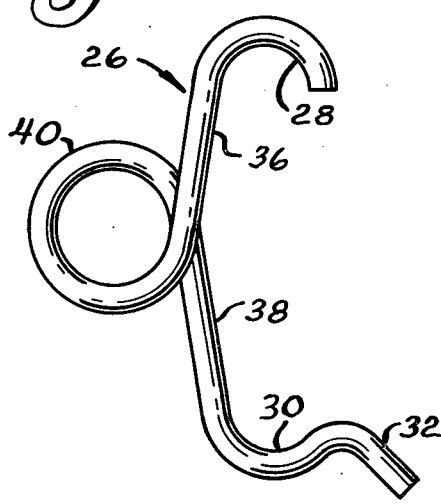
FIG. 3 is a front view showing the improved retaining clip.
Figure 4:
FIG. 4 is a right side view of the clip shown in FIG. 3.
Figure 5:
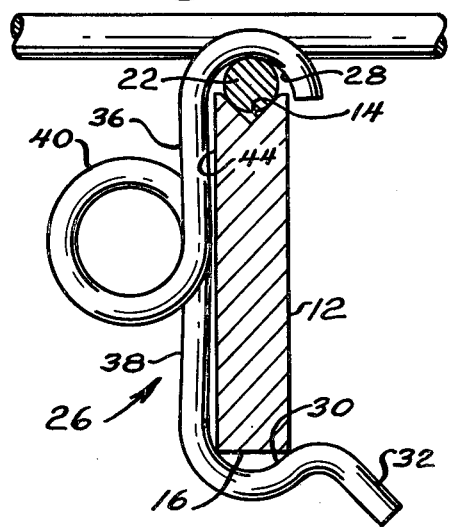
FIG. 5 is a view similar to FIG. 2 but showing the improved retaining clip.

The improved spring retaining clip shown at 26 in FIGS. 3-5 is far superior to the prior art clip 26' shown in FIG. 2. The clip 26 includes a semi-circular upper end portion 28 and a semi-circular lower end portion 30 which respectively engage the support rod 22 and the lower end 16 of the mounting bar in a manner similar to the prior art clip. However, clip 26 includes upper and lower intermediate portions 36,38 which join the respective end portions 28,30 to a central loop portion 40. The intermediate portions 36,38 are preferably formed so as to each diverge at about a 10° angle from the vertical. To assemble the clip 26 to the support bar 22 and mounting bar 12 the upper curved surface 28 is first dropped over the support bar 22 and a mounting tool (not shown) is used to press down on the loop portion 40 so as to cause the ramp-like extension surface 32 of the lower end portion 30 to ride over the lower end 16 of the mounting bar 12. As the ends 28, 30 of the fastener are stretched apart during assembly, the intermediate portions 36,38 will move into or slightly past a vertically aligned position where they will engage or come very close to the vertical side surface 44 of mounting bar 12. This positioning of the intermediate portion 36,38 in contact with the surface 44 of the mounting bar 12 or close to it limits the movement of loop 40 toward the mounting bar and insures that additional forces which might tend to lift support rod 22 out of groove 14 will be transmitted directly to the loop portion 40. The loop portion 40 resists these forces due to the fact that its diameter is reduced by the upward movement of intermediate portion 36 and the downward movement of intermediate portion 38.

The dimensions of the clip 26 can vary with the type of installation. Changes in the diameter of the loop portion 40 result in changes in the force exerted by the clip and the amount of set the clip will take during installation. For example, the larger the diameter of the loop portion 40, the less force the spring will exert and the less set it will take. Thus, the loop diameter should be selected to provide sufficient retaining force and a tolerable amount of set.

I claim as my invention:

1. In a vibrating screen deck of the type including a plurality of screen mounting bars which are adapted to be vibrated and a removable screen panel including a plurality of support rods in overlying, parallel contacting relationship with the screen mounting bars, the improvement comprising a plurality of spring retaining clips for removably retaining said support rods in firm contact with said screen mounting bars, each of said clips being formed of a single piece of heavy gauge spring wire which is formed so as to define upper and lower portions which define concave configurations which face each other and which respectively engage the top of a support rod on a screen panel and the bottom of an associated screen mounting bar on a vibrating frame, said upper and lower portions being joined together by a pair of upper and lower intermediate portions and a single loop central spring portion which is directed outwardly from said intermediate portions in the general plane of the upper and lower portions and of the intermediate portions but on the opposite side of said intermediate portions from said upper and lower portions, said intermediate portions of said clips being formed so that when the clips are in their free state prior to assembly, they will slightly diverge, as they approach each other, from a line parallel to a line connecting the centers of curvature of the concave configurations of the upper and lower portions, said intermediate portions being moved during assembly of the clips to the screen mounting bars and support rods to an assembled use position parallel to said last named line or slightly converging toward it, said single loop spring portion being shaped so that the diameter of the loop will be decreased and the force of the spring increased when separating forces developed by the vibration of said screen mounting bars during use are applied by said support rods and screen mounting bars to said upper and lower portions tending to move them away from each other, said single loop spring portion having a maximum outer diameter when the clip is in its free state which is less than about one half the distance between the facing concave configurations of the upper and lower portions, said clips further including a ramp-like extension portion extending outwardly beyond the outer extremity of the concave configuration in said lower portion and downwardly away from said upper portion for facilitating the assembly of said clips to said support rods and screen mounting bars.

2. A spring retaining clip for a vibrating screen deck comprising a single piece of heavy gauge wire which is formed so as to define upper and lower portions which define concave configurations which face each other and are adapted to engage the top of a support rod on a removable screen panel and the bottom of an associated screen mounting bar on a vibrating frame, said upper and lower portions being joined together by a pair of upper and lower intermediate portions and a single loop central spring portion which is directed outwardly from said intermediate portions in the general plane of the upper and lower portions and of the intermediate portions but on the opposite side of said intermediate portions from said upper and lower portions, said single loop spring portion being shaped so that the diameter of the loop will be decreased and the force of the spring increased when separating forces developed by the vibration of said mounting bar during operation of said deck are applied to said upper and lower portions tending to move them away from each other, said single loop spring portion having a maximum outer diameter when the clip is in its free state which is less than about one half the distance between the facing concave configurations of the upper and lower portions, said intermediate portions being formed so that when the clip is in its free state prior to assembly to a screen deck, they will slightly diverge, as they approach each other, from a line parallel to a line connecting the centers of curvature of the concave configurations of the upper and lower portions, said intermediate portions being movable, when separating forces are applied to said upper and lower portions to move said upper and lower portions apart during the assembly of said clip to an associated support rod and mounting bar, to a use position parallel to said last named line or slightly converging toward it, said clip further including a ramp-like extension portion extending outwardly beyond the outer extremity of the concave configuration in said lower portion and downwardly away from said upper portion for facilitating the assembly of said clip to an associated support rod and screen mounting bar with which it is adapted to be used.

* * * * *